United States Patent
Fu et al.

(10) Patent No.: US 11,293,175 B2
(45) Date of Patent: Apr. 5, 2022

(54) SELF-RESETTING TUNED MASS DAMPER BASED ON EDDY CURRENT AND SHAPE MEMORY ALLOY TECHNOLOGY

(71) Applicant: DALIAN UNIVERSITY OF TECHNOLOGY, Liaoning (CN)

(72) Inventors: Xing Fu, Liaoning (CN); Hongnan Li, Liaoning (CN); Wenlong Du, Liaoning (CN); Xifeng Zhong, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 37 days.

(21) Appl. No.: 16/968,782

(22) PCT Filed: Sep. 20, 2019

(86) PCT No.: PCT/CN2019/106887
§ 371 (c)(1),
(2) Date: Aug. 10, 2020

(87) PCT Pub. No.: WO2021/051372
PCT Pub. Date: Mar. 25, 2021

(65) Prior Publication Data
US 2021/0148114 A1     May 20, 2021

(51) Int. Cl.
*E04B 1/98*     (2006.01)
*E04H 9/02*     (2006.01)

(52) U.S. Cl.
CPC ............. *E04B 1/98* (2013.01); *E04H 9/0215* (2020.05)

(58) Field of Classification Search
CPC ........ E04B 1/98; E04H 9/0215; F16F 15/035; F16F 15/03
See application file for complete search history.

(56) References Cited

U.S. PATENT DOCUMENTS

| 9,145,945 B2* | 9/2015 | Tan ........................ F16F 15/022 |
| 2005/0268565 A1* | 12/2005 | Takabatake ........... E04H 9/0215 52/167.2 |

(Continued)

FOREIGN PATENT DOCUMENTS

| CN | 101761146 A | 6/2010 |
| CN | 107268824 A | 10/2017 |

(Continued)

*Primary Examiner* — Brian E Glessner
*Assistant Examiner* — Daniel J Kenny
(74) *Attorney, Agent, or Firm* — Muncy, Geissler, Olds & Lowe, P.C.

(57) ABSTRACT

A self-resetting tuned mass damper is based on eddy current and shape memory alloy technology. The self-resetting tuned mass damper comprises a hollow box, a cover plate, a bolt, a mass block, gears a, gears b, gears c, copper sheets, permanent magnet groups, partition boards, balls, pins, levers, shape memory alloys, rotating shafts a, rotating shafts b, a supporting plate and rotating shafts c. The movement of the mass block causes the copper sheets to rotate and generate eddy current for energy consumption. The copper sheets are rotated and amplified by adjusting the sizes of the gears. The displacement of a small mass block can cause rotation of the copper sheets by a large angle, which greatly increases energy consumption efficiency. The elongation of the shape memory alloys is amplified by adjusting the ratio of long and short force arms of the levers.

8 Claims, 2 Drawing Sheets

(56) References Cited

U.S. PATENT DOCUMENTS

| | | | |
|---|---|---|---|
| 2007/0131504 A1* | 6/2007 | Bronowicki | F16F 15/035 |
| | | | 188/378 |
| 2017/0108034 A1 | 4/2017 | McGuire | |
| 2021/0087841 A1* | 3/2021 | Fu | E04H 9/0215 |
| 2021/0102395 A1* | 4/2021 | Lori | E04B 1/98 |

FOREIGN PATENT DOCUMENTS

| | | |
|---|---|---|
| CN | 107355509 A | 11/2017 |
| CN | 208280702 U | 12/2018 |
| CN | 109780114 A | 5/2019 |
| CN | 209293533 U | 8/2019 |
| JP | 2011069104 A | 4/2011 |
| TW | 201439405 A | 10/2014 |

\* cited by examiner

SELF-RESETTING TUNED MASS DAMPER BASED ON EDDY CURRENT AND SHAPE MEMORY ALLOY TECHNOLOGY

TECHNICAL FIELD

The present invention belongs to the technical field of structural vibration control, and particularly relates to a self-resetting tuned mass damper based on eddy current and shape memory alloy technology.

BACKGROUND

With the development of the country, the number of high buildings, high structures and long-span structures is gradually increasing. Under the action of dynamic loads such as strong wind and earthquakes, these structures will generate relatively large vibration, thereby affecting the normal use and safety of the structures. Structural vibration control is to dissipate or isolate the effect of external excitation on the structures by arranging vibration reduction or vibration isolation devices in the structures. At present, the research and development of vibration control devices are mostly focused on passive control devices which have the advantages of simple structure and no need of manual intervention; among these devices, a tuned mass damper is a type of passive control device that is widely used.

The tuned mass damper is a sub-structure added to a main structure, and its natural frequency is close to the natural frequency of the main structure. When the main structure vibrates, the sub-structure produces an opposite inertial force, so that the vibration of the main structure is attenuated. To achieve predetermined vibration reduction performance for a traditional tuned mass damper, the ratio of its own mass to the mass of a controlled structure needs to reach a certain range, but limited by installation space and other factors, the design mass is often small and cannot achieve an expected vibration reduction effect. This requires the combination of other technologies and the tuned mass damper to increase the vibration reduction efficiency, and eddy current and shape memory alloy technology have good energy consumption and vibration reduction capability.

Eddy current damping technology is based on the law of electromagnetic induction to convert mechanical energy of object motion into electrical energy in a conductor plate, and then convert the electrical energy into thermal energy through the thermal resistance effect of the conductor plate to dissipate the vibrational energy of a system. After the conductor plate moves in a magnetic field and generates an eddy current, the eddy current will interact with an original magnetic field to generate a damping force that hinders the relative motion of the conductor plate and the magnetic field; and at the same time, the eddy current generated in the conductor plate is continuously dissipated to the surrounding environment in the form of thermal energy. Eddy current damping technology adopts a non-contact energy dissipation mode, which has the advantages of good durability, long life and easy damping adjustment, and is widely used.

Shape memory alloy is a novel functional material with many special mechanical properties, including significant shape memory effect, phase transition superelasticity and high damping characteristics. Compared with other materials, the shape memory alloy has better fatigue resistance performance and larger recoverable strain of deformation (6% to 8%). Therefore, compared with other types of dampers, a damper made based on the shape memory alloy has the characteristic of automatic recovery after deformation and higher damping energy consumption capability, can effectively reduce the damage to the structure under the effects of the earthquakes and wind vibration, and can reduce the post-disaster repair cost.

In view of the defects of the existing product, the present invention combines the tuned mass damper with the eddy current and shape memory alloy technology to propose a self-resetting tuned mass damper based on eddy current and shape memory alloy technology.

SUMMARY

In view of the problems of low damping energy consumption and cumbersome maintenance process in the prior art, the present invention proposes a self-resetting tuned mass damper based on eddy current and shape memory alloy technology, which has high damping energy consumption, low maintenance cost and automatic resetting function.

To achieve the above purpose, the present invention adopts the following technical solution:

A self-resetting tuned mass damper based on eddy current and shape memory alloy technology is provided. The self-resetting tuned mass damper comprises a hollow box 1, a cover plate 2, a bolt 3, a mass block 4, gears a 5, gears b 6, gears c 7, copper sheets 8, permanent magnet groups 9, partition boards 10, balls 11, pins 12, levers 13, shape memory alloys 14, rotating shafts a 15, rotating shafts b 16, a supporting plate 17 and rotating shafts c 18.

The hollow box 1 and the cover plate 2 are fixedly connected through the bolt 3 to form a main body frame of the self-resetting tuned mass damper; the hollow box 1 and the cover plate 2 are fixedly installed between main body structures; four groups of partition boards 10 are arranged; the partition boards 10 and an inner wall surface of the main body frame form a square space; the interiors of the partition boards 10 are used for installing the permanent magnet group 9; the mass block 4 is put into the main body frame and located among the four groups of partition boards 10; a plurality of balls 11 are installed on an upper surface and a lower surface of the mass block 4 for supporting the sliding of the mass block 4 between the hollow box 1 and the cover plate 2; the sliding direction of the mass block 4 is parallel to a vertical connecting line between two installing surfaces of the damper; tooth slots are formed on two vertical side surfaces of the mass block 4; the mass block 4 is provided with two rectangular slots for installing the lever 13; two gears a 5 and two gears b 6 are arranged, and respectively fixedly installed on two rotating shafts a 15 to realize synchronous rotation of the gears a 5 and the gears b 6; the gears a 5 are engaged with the tooth slots of the mass block 4; both ends of the rotating shafts a 15 are fixedly installed on outer surfaces of the partition boards 10 through the supporting plate 17; two gears c 7 are arranged, and respectively fixedly installed on two rotating shafts b 16; the gears c 7 are engaged with the gears b 6; the rotating shafts b 16 penetrate through the partition boards 10, and both ends of the rotating shafts b 16 are installed on the inner wall surface of the main body frame through bearings, and the rotating shafts b 16 rotate with the gears c 7; four permanent magnet groups 9 are arranged, and are correspondingly installed in the square space; each group has two permanent magnets; four copper sheets 8 are arranged; each pair of copper sheets is installed symmetrically on the rotating shafts b 16; each copper sheet 8 is located between the corresponding permanent magnet groups 9; magnetic induction lines of the permanent magnet groups 9 are perpendicular to the copper sheets 8; four levers 13 are arranged; through holes a 131 are formed on the end parts of the levers 13; through holes b 132 are formed in the middles of the levers; a group of two levers 13 is hinged on the rectangular slots of the hollow box 1 by the pins 12 through the through holes a 131; hinging positions can rotate under the action of an external force; four rotating shafts c 18 are arranged, and respectively fixed on the inner wall of the hollow box 1 through the through holes a 131; the axes of the levers 13 are kept horizontal; and four shape memory alloys 14 are arranged, and both ends are respectively connected with the ends of the levers 13 and the inner wall of the hollow box 1.

Further, the radius of the gears b is larger than the radius of the gears c.

Further, the hollow box 1, the cover plate 2, the bolt 3, the mass block 4, the gears a 5, the gears b 6, the gears c 7, the partition boards 10, the balls 11, the pins 12, the levers 13, the rotating shafts a 15, the rotating shafts b 16, the supporting plate 17 and the rotating shafts c 18 are made of permeability magnetic material.

Further, a distance between the centers of the through holes a 131 and the centers of the through holes b 132 is $L_1$, a distance between the centers of the through holes b 132 and installing points of the shape memory alloys 14 is $L_2$, and a ratio of $L_2$ to $L_1$ is larger than 1.

Further, the balls 11 are coated with lubricating oil to reduce frictional resistance.

The working principle of the invention is as follows:

When the structure vibrates, the mass block and a damper shell fixed on the structure generate relative displacement under the effect of inertia to drive the levers and the gears to rotate. The rotation of the levers causes the deformation of the shape memory alloys, which converts the mechanical energy into the strain energy of the shape memory alloys and dissipates the strain energy. When the copper sheets rotate in a magnetic field, an induced electromotive force is generated inside, thereby generating eddy current in the copper sheets. The eddy current effect may produce a damping force that impedes the rotation of the copper sheets. Meanwhile, it can be known from the thermal effect of the eddy current that vibration energy is converted into heat energy, thereby reducing structural vibration.

Further, the sliding distance of the mass block is d, the radius of the gears a is Ra, the radius of the gears b is Rb, the radius of the gears c is Rc, and Rb>Rc; the rotation angle of the copper sheets can be amplified; the rotation angle is $(d/R_a) \times (R_b/R_c)$; and the amplification is $R_b/R_c$, that is, the larger the radius ratio of the gears b to the gears c is, the higher the energy consumption efficiency is. In addition, if the ratio of long and short force arms of the levers is m/n, the elongation of the shape memory alloys is d×m/n, that is, the larger the ratio of the force arms of the levers is, the higher the energy consumption efficiency is.

The present invention has the following beneficial effects:

(1) In the self-resetting tuned mass damper based on eddy current and shape memory alloy technology in the present invention, the axial movement of the mass block causes the copper sheets to rotate and generate eddy current for energy consumption. The copper sheets are rotated and amplified by adjusting the sizes of the gears. The displacement of a small mass block can cause rotation of the copper sheets by a large angle, which greatly improves energy consumption efficiency.

(2) In the self-resetting tuned mass damper based on eddy current and shape memory alloy technology in the present invention, the elongation of the shape memory alloys is amplified by adjusting the ratio of long and short force arms of the levers. The displacement of the small mass block can cause large elongation of the shape memory alloys so that the energy consumption efficiency is high.

(3) In the self-resetting tuned mass damper based on eddy current and shape memory alloy technology in the present invention, the damping parameters can be adjusted by adjusting the radius ratio of the gears, the ratio of the force arms of the levers, the number of the shape memory alloys, the mass of the mass block, magnetic field strength of the permanent magnets, the thickness of the copper sheets and the distance from the copper sheets to the permanent magnets.

(4) In the self-resetting tuned mass damper based on eddy current and shape memory alloy technology in the present invention, the permanent magnets are adopted to provide continuous magnetic field sources, without external energy, thereby generating long-term and stable vibration reduction effect.

(5) In the self-resetting tuned mass damper based on eddy current and shape memory alloy technology in the present invention, the use of the permeability magnetic material can effectively avoid magnetic flux leakage of a magnetic circuit, which not only improves the damping efficiency of the eddy current, but also avoids the influence on various surrounding components.

(6) The self-resetting tuned mass damper based on eddy current and shape memory alloy technology in the present invention is reasonable in design, simple in structure, and convenient in installation.

In the figures: 1 hollow box; 2 cover plate; 3 bolt; 4 mass block; 5 gear a; 6 gear b; 7 gear c; 8 copper sheet; 9 permanent magnet group; 10 partition board; 11 ball; 12 pin; 13 lever; 14 shape memory alloy; 15 rotating shaft a; 16 rotating shaft b; 17 supporting plate; 18 rotating shaft c; 131 through hole a; and 132 through hole b.

DETAILED DESCRIPTION

In order to make the purpose, features, and advantages of the present invention more obvious and understandable, the present invention is further described below with reference to the drawings and in conjunction with specific embodiments, so that those skilled in the art can implement the present invention with reference to the words of the description. The protection scope of the present invention is not limited to the detailed description. Apparently, the embodiments described below are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
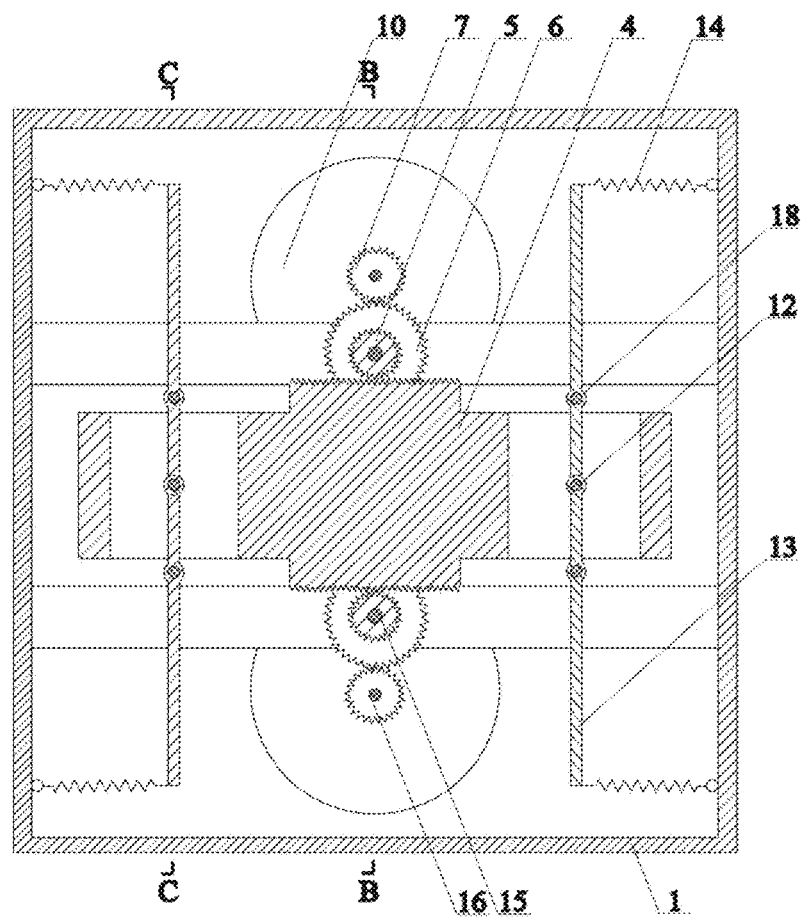
FIG. 1 is an A-A sectional view of a self-resetting tuned mass damper based on eddy current and shape memory alloy technology in the present invention.
Figure 2:
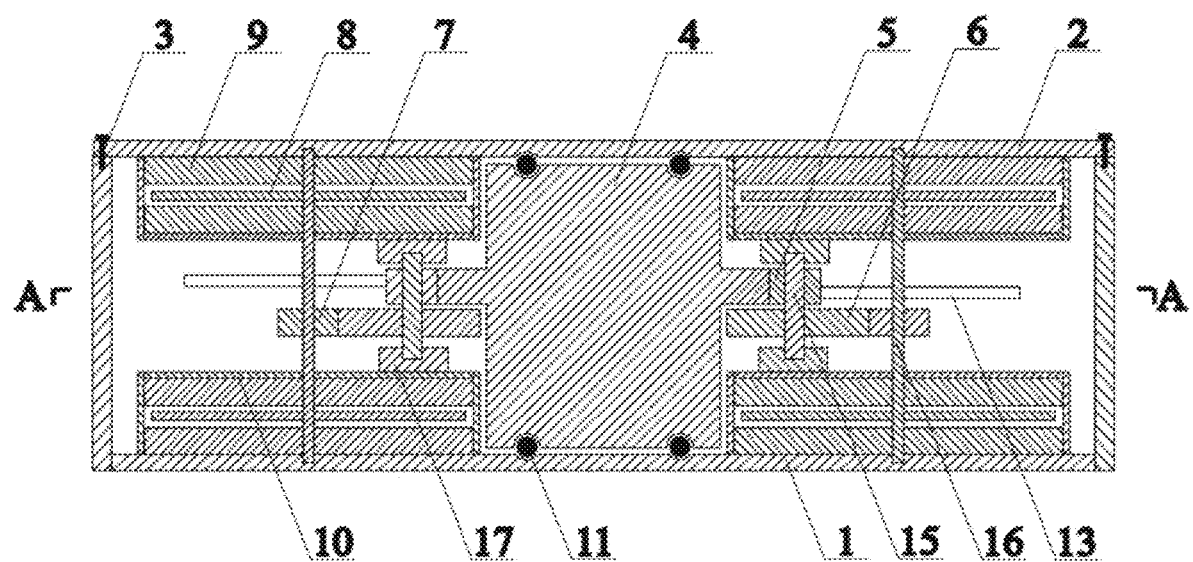
FIG. 2 is a B-B sectional view of a self-resetting tuned mass damper based on eddy current and shape memory alloy technology in the present invention.
Figure 3:
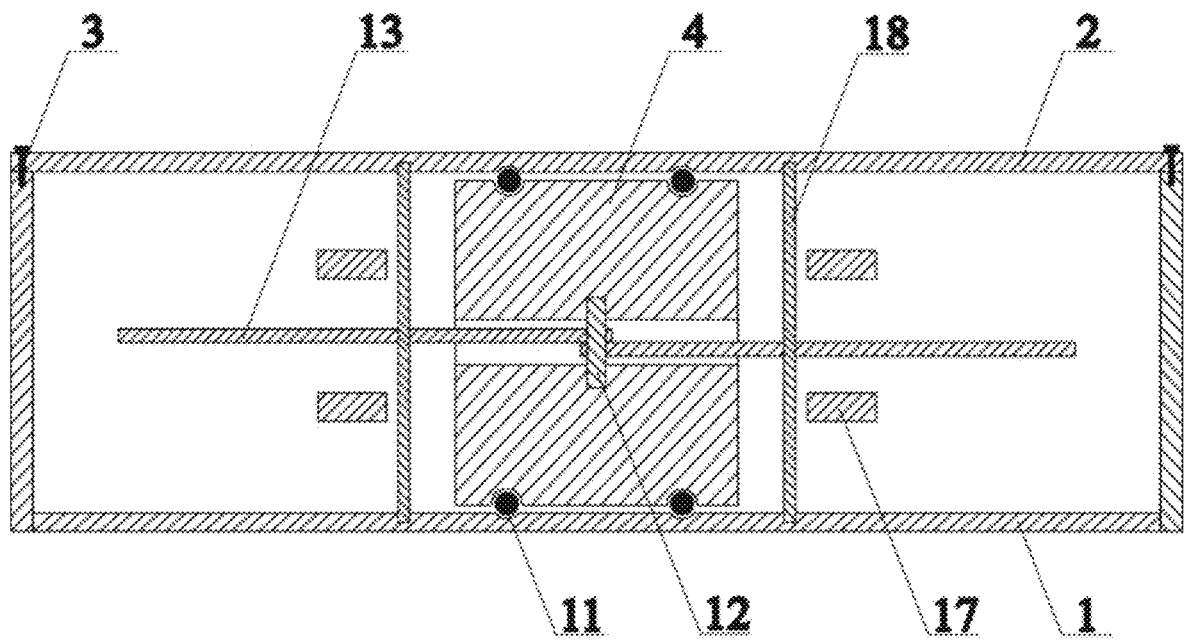
FIG. 3 is a C-C sectional view of a self-resetting tuned mass damper based on eddy current and shape memory alloy technology in the present invention.

A self-resetting tuned mass damper based on eddy current and shape memory alloy technology is shown in FIG. 1, FIG. 2 and FIG. 3. The self-resetting tuned mass damper comprises a hollow box 1, a cover plate 2, a bolt 3, a mass block 4, gears a 5, gears b 6, gears c 7, copper sheets 8, permanent magnet groups 9, partition boards 10, balls 11, pins 12, levers 13, shape memory alloys 14, rotating shafts a 15, rotating shafts b 16, a supporting plate 17 and rotating shafts c 18.

Figure 4:
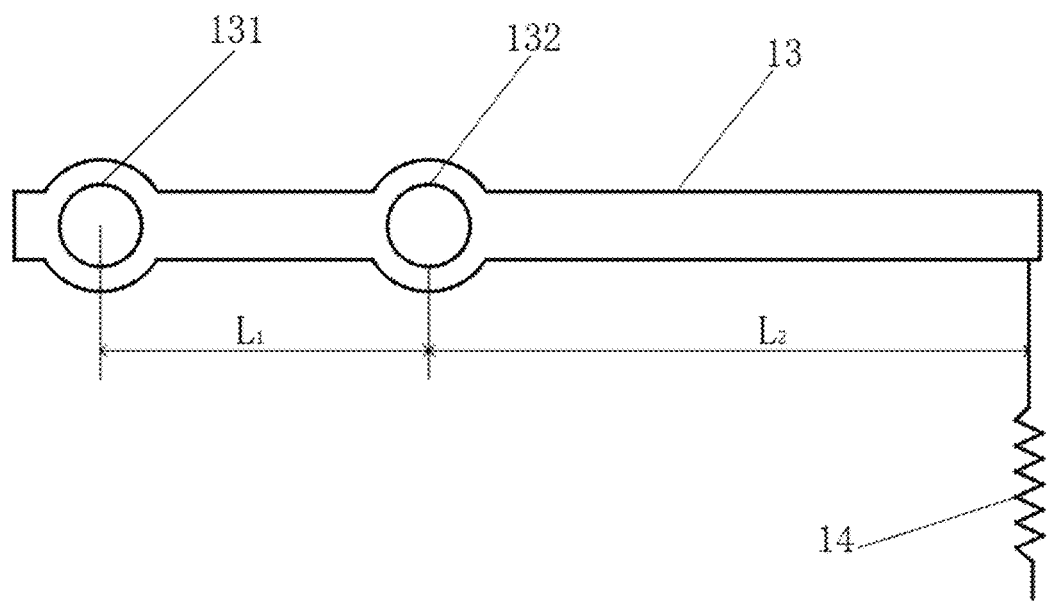
FIG. 4 is a structural schematic diagram of a lever of the present invention.

The hollow box 1 and the cover plate 2 are fixedly connected through the bolt 3 to form a main body frame of the self-resetting tuned mass damper; the hollow box 1 and the cover plate 2 are fixedly installed between main body structures; four groups of partition boards 10 are arranged; the partition boards 10 and an inner wall surface of the main body frame form a square space; the interiors of the partition boards 10 are used for installing the permanent magnet group 9; the mass block 4 is put into the main body frame and located among the four groups of partition boards 10; a plurality of balls 11 are installed on an upper surface and a lower surface of the mass block 4 for supporting the sliding of the mass block 4 between the hollow box 1 and the cover plate 2; the sliding direction of the mass block 4 is parallel to a vertical connecting line between two installing surfaces of the damper; tooth slots are formed on two vertical side surfaces of the mass block 4; the mass block 4 is provided with two rectangular slots for installing the lever 13; two gears a 5 and two gears b 6 are arranged, and respectively fixedly installed on two rotating shafts a 15 to realize synchronous rotation of the gears a 5 and the gears b 6; the gears a 5 are engaged with the tooth slots of the mass block 4; both ends of the rotating shafts a15 are fixedly installed on outer surfaces of the partition boards 10 through the supporting plate 17; two gears c 7 are arranged, and respectively fixedly installed on two rotating shafts b 16; the gears c 7 are engaged with the gears b 6; the rotating shafts b 16 penetrate through the partition boards 10, and both ends of the rotating shafts b 16 are installed on the inner wall surface of the main body frame through bearings, and the rotating shafts b 16 rotate with the gears c 7; four permanent magnet groups 9 are arranged, and are correspondingly installed in the square space; each group has two permanent magnets; four copper sheets 8 are arranged; each pair of copper sheets is installed symmetrically on the rotating shafts b 16; each copper sheet 8 is located between the corresponding permanent magnet groups 9; magnetic induction lines of the permanent magnet groups 9 are perpendicular to the copper sheets 8; four levers 13 as shown in FIG. 4 are arranged; through holes a 131 are formed on end parts of the levers 13; through holes b 132 are formed in the middles of the levers; a group of two levers 13 is hinged on the rectangular slots of the hollow box 1 by the pins 12 through the through holes a 131; hinging positions can rotate under the action of an external force; four rotating shafts c 18 are arranged, and respectively fixed on the inner wall of the hollow box 1 through the through holes a 131; the axes of the levers 13 are kept horizontal; and four shape memory alloys 14 are arranged, and both ends are respectively connected with the ends of the levers 13 and the inner wall of the hollow box 1.

Further, the radius of the gears b is larger than the radius of the gears c.

Further, the hollow box 1, the cover plate 2, the bolt 3, the mass block 4, the gears a 5, the gears b 6, the gears c 7, the partition boards 10, the balls 11, the pins 12, the levers 13, the rotating shafts a 15, the rotating shafts b 16, the supporting plate 17 and the rotating shafts c 18 are made of permeability magnetic material.

Further, a distance between the centers of the through holes a 131 and the centers of the through holes b 132 is $L_1$, a distance between the centers of the through holes b 132 and installing points of the shape memory alloys 14 is $L_2$, and a ratio of $L_2$ to $L_1$ is larger than 1.

Further, the balls 11 are coated with lubricating oil to reduce frictional resistance.

When the structure vibrates, a device shell rigidly connected with the structure moves horizontally, and the mass block 4 generates displacement hysteresis under the effect of inertia, which applies a force to the structure in the opposite direction of the movement, thereby reducing the structural amplitude. Meanwhile, the shape memory alloys 14 allow the mass block 4 to automatically reset after moving.

The mass block 4 and the shell generate relative displacement. The teeth on the side edge drive the gears a 5 and the gears b 6; the gears b 6 drive the gears c 7; the gears c 7 drive the copper sheets 8 to cut the magnetic induction lines to generate eddy current and consume energy; and the rotation angle of the copper sheets 8 is enlarged by adjusting the radius ratio of the gears, which greatly increases the energy consumption efficiency.

The levers 13 move under the drive of the mass block 4 and the shape memory alloys 14 are elongated. The vibration mechanical energy is converted into the elastic potential energy of the shape memory alloys 14, which reduces the structural amplitude. The elongation of the shape memory alloys 14 is increased by adjusting the ratio of the force arms of the levers 13, thereby increasing the energy consumption efficiency.

The axial movement of the mass block 4 causes the copper sheets 8 to rotate and generate eddy current for energy consumption. The copper sheets 8 are rotated and amplified by adjusting the sizes of the gears. The displacement of a small mass block 4 can cause rotation of the copper sheets 8 by a large angle, which greatly increases energy consumption efficiency. The elongation of the shape memory alloys 14 is amplified by adjusting the ratio of long and short force arms of the levers 13. The displacement of the small mass block 4 can cause large elongation of the shape memory alloys 14 so that the energy consumption efficiency is high. The damping parameters can be adjusted by changing the radius ratio of the gears, the ratio of the force arms of the levers 13, the number of the shape memory alloys 14, the mass of the mass block 4, magnetic field strength of the permanent magnets 9, the thickness of the copper sheets 8 and the distance from the copper sheets 8 to the permanent magnets 9. The permanent magnets 9 are adopted to provide continuous magnetic field sources, without external energy, thereby generating long-term and stable vibration reduction effect. The use of the permeability magnetic material can effectively avoid magnetic flux leakage of a magnetic circuit, which not only increases the damping efficiency of the eddy current, but also avoids the influence on various surrounding components. The present invention has reasonable design, simple structure and convenient installation.

Attention shall be paid during the design of the present invention: firstly, the radius of the gears b 6 is larger than the radius of the gears c 7. Secondly, the ratio of the long and short force arms of the levers 13 is larger than 3, wherein the force arm near the shape memory alloys 14 is a long force arm, and the force arm near the mass block 4 is a short force arm. Thirdly, the hollow box 1, the cover plate 2, the bolt, the mass block 4, the gears, the partition boards 10, the balls, the pins 12, the levers 13, the rotating shafts and the supporting plate 17 are made of permeability magnetic material. The balls 11 are spherical steel balls. All the balls 11 are coated with lubricating oil to reduce friction.

The above embodiments of the present invention are not intended to limit the protection scope of the present invention, and the embodiments of the present invention are not limited thereto. According to the above content of the present invention and in accordance with ordinary technical knowledge and frequently-used means in the art, other various modifications, replacements or alterations made to the above structure of the present invention without departing from the basic technical idea of the present invention shall fall within the protection scope of the present invention.

The invention claimed is:

1. A self-resetting tuned mass damper based on eddy current and shape memory alloy technology, comprising a hollow box, a cover plate, a bolt, a mass block, first gears, second gears, third gears, copper sheets, permanent magnet groups, partition boards, balls, pins, levers, shape memory alloys, first rotating shafts, second rotating shaft, a supporting plate and third rotating shafts, wherein the hollow box and the cover plate are fixedly connected via the bolt to form a main body frame of the self-resetting tuned mass damper; the hollow box and the cover plate are fixedly installed; four groups of partition boards are arranged such that the partition boards and an inner wall surface of the main body frame form a square space; the permanent magnet group are installed on the interiors of the partition boards; the mass block is in the main body frame and located among the four groups of partition boards; a plurality of balls are installed on an upper surface and a lower surface of the mass block for supporting the sliding of the mass block between the hollow box and the cover plate; the sliding direction of the mass block is parallel to a vertical connecting line between two installing surfaces of the damper; tooth slots are formed on two vertical side surfaces of the mass block; the mass block is provided with two rectangular slots for installing the lever; two the first gears and two the second gears are respectively fixedly installed on two the first rotating shafts to realize synchronous rotation of the first gears and the second gears; the first gears are engaged with the tooth slots of the mass block; both ends of the first rotating shafts are fixedly installed on outer surfaces of the partition boards through the supporting plate; two the third gears are respectively fixedly installed on two the second rotating shafts; the third gears are engaged with the second gears; the second rotating shafts penetrate through the partition boards, and both ends of the rotating shafts are installed on the inner wall surface of the main body frame through bearings, and the second rotating shafts rotate with the third gears; four permanent magnet groups are installed in the square space; each permanent magnet group has two permanent magnets; four copper sheets are arranged such that two pairs of the copper sheets are installed symmetrically on the second rotating shafts; each copper sheet is located between the corresponding permanent magnet groups; magnetic induction lines of the permanent magnet groups are perpendicular to the copper sheets; four levers are arranged; first through holes are formed on the end parts of the levers; second through holes are formed in the middles of the levers; two pairs of the levers is hinged on the rectangular slots of the hollow box by the pins through the first through holes; four the third rotating shafts are respectively fixed on the inner wall of the hollow box through the first through holes; axes of the levers are kept horizontal; and both ends of four shape memory alloys are respectively connected with the ends of the levers and the inner wall of the hollow box.

2. The self-resetting tuned mass damper based on eddy current and shape memory alloy technology according to claim 1, wherein the radius of the second gears is larger than the radius of the third gears.

3. The self-resetting tuned mass damper based on eddy current and shape memory alloy technology according to claim 1, wherein the balls are coated with lubricating oil to reduce frictional resistance.

4. The self-resetting tuned mass damper based on eddy current and shape memory alloy technology according to claim 1, wherein the hollow box, the cover plate, the bolt, the mass block, the first gears the second gears, the third gears, the partition boards, the balls, the pins, the levers, the first rotating shafts, the second rotating shafts, the supporting plate and the third rotating shafts are made of permeability magnetic material.

5. The self-resetting tuned mass damper based on eddy current and shape memory alloy technology according to claim 4, wherein a distance between the centers of the first through holes and the centers of the second through holes is $L_1$, a distance between the centers of the second through holes and installing points of the shape memory alloys is $L_2$, and a ratio of $L_2$ to $L_1$ is larger than 1.

6. The self-resetting tuned mass damper based on eddy current and shape memory alloy technology according to claim 4, wherein the balls are coated with lubricating oil to reduce frictional resistance.

7. The self-resetting tuned mass damper based on eddy current and shape memory alloy technology according to claim 1, wherein a distance between the centers of the first through holes and the centers of the second through holes is $L_1$, a distance between the centers of the second through holes and installing points of the shape memory alloys is $L_2$, and a ratio of $L_2$ to $L_1$ is larger than 1.

8. The self-resetting tuned mass damper based on eddy current and shape memory alloy technology according to claim 7, wherein the balls are coated with lubricating oil to reduce frictional resistance.

* * * * *